United States Patent
Midtskogen Berger et al.

(10) Patent No.: US 9,374,232 B2
(45) Date of Patent: Jun. 21, 2016

(54) METHOD AND A DEVICE FOR OPTIMIZING LARGE SCALED VIDEO CONFERENCES

(71) Applicant: Videxio AS, Lysaker (NO)

(72) Inventors: Thomas Midtskogen Berger, Oslo (NO); Viggo Fredriksen, Oslo (NO)

(73) Assignee: Videxio AS (NO)

( * ) Notice: Subject to any disclaimer, the term of this patent is extended or adjusted under 35 U.S.C. 154(b) by 0 days.

(21) Appl. No.: 14/653,029

(22) PCT Filed: Dec. 16, 2013

(86) PCT No.: PCT/EP2013/076632
§ 371 (c)(1),
(2) Date: Jun. 17, 2015

(87) PCT Pub. No.: WO2014/095671
PCT Pub. Date: Jun. 26, 2014

(65) Prior Publication Data
US 2015/0326824 A1   Nov. 12, 2015

(30) Foreign Application Priority Data
Dec. 19, 2012   (NO) .................................. 20121566

(51) Int. Cl.
*H04L 12/18* (2006.01)
*H04L 29/06* (2006.01)
*H04N 7/15* (2006.01)

(52) U.S. Cl.
CPC ........ *H04L 12/1822* (2013.01); *H04L 12/1854* (2013.01); *H04L 12/1868* (2013.01); *H04L 65/1069* (2013.01); *H04L 65/403* (2013.01); *H04L 65/4038* (2013.01); *H04N 7/152* (2013.01)

(58) Field of Classification Search
USPC ........................................................ 348/14.09
See application file for complete search history.

(56) References Cited

U.S. PATENT DOCUMENTS

| | | | |
|---|---|---|---|
| 7,929,011 B2 * | 4/2011 | Elbaze | H04N 7/15 348/14.08 |
| 2005/0078170 A1 | 4/2005 | Firestone et al. | |
| 2006/0023062 A1 | 2/2006 | Elbaze et al. | |
| 2006/0233120 A1 * | 10/2006 | Eshel | H04L 12/1822 370/260 |
| 2007/0091169 A1 | 4/2007 | Zhang et al. | |
| 2008/0267282 A1 | 10/2008 | Kalipatnapu et al. | |
| 2009/0315975 A1 | 12/2009 | Wiener et al. | |

FOREIGN PATENT DOCUMENTS

WO   03/052611 A1   6/2003

OTHER PUBLICATIONS

Norwegian Search Report dated Jul. 19, 2013 for corresponding Norwegian Application Serial No. 20121566, Norwegian Filing Date: Dec. 19, 2012, consisting of 3 pages.
International Search Report and Written Opinion dated May 2, 2014 for International Application Serial No: PCT/EP2013/076632, International Filing Date: Dec. 16, 2013, consisting of 9 pages.

* cited by examiner

*Primary Examiner* — Amal Zenati
(74) *Attorney, Agent, or Firm* — Christopher & Weisberg, P.A.

(57) ABSTRACT

The embodiments herein disclose a system and a method for optimizing large scaled video conferences.

9 Claims, 1 Drawing Sheet

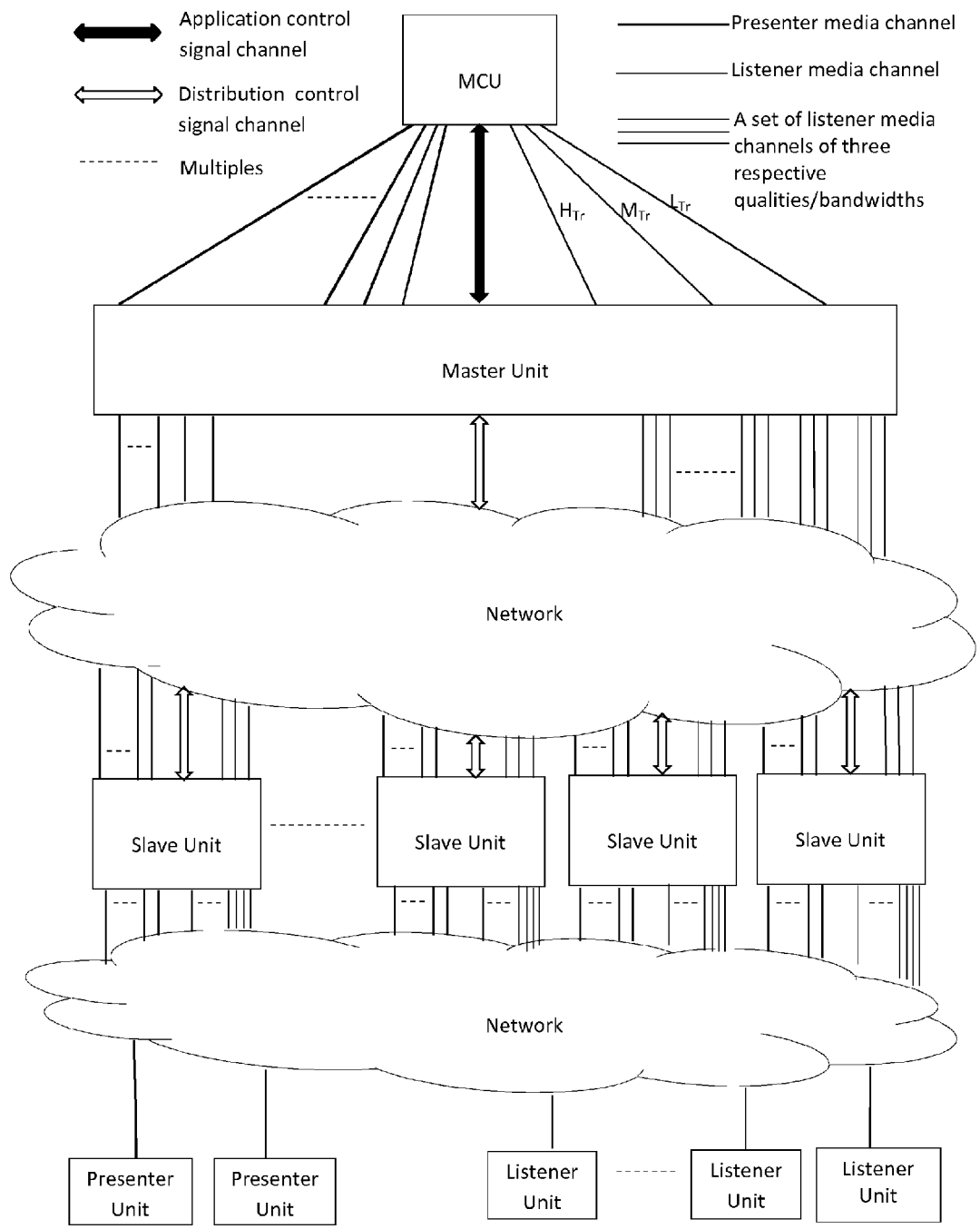

METHOD AND A DEVICE FOR OPTIMIZING LARGE SCALED VIDEO CONFERENCES

TECHNICAL FIELD

The embodiments herein relate to optimizing large video conferences which involves a Multipoint Control Unit (MCU).

BACKGROUND

Video conferencing is increasingly employed to facilitate communication between parties at different locations. Current video conferencing technology allows video and audio information, captured at various video network endpoints, to be selectively shared among video conference participants. The benefits of video conferencing include not only enhanced audio and video communication, but also an elimination of the time and expense of travel. However, as the number of participants in the video conference increases, a number of difficulties may limit the efficiency of sharing the video conference information with all participants. Specifically, as the number of video conferencing endpoints involved within a specific video conference increases, the bandwidth necessary for transmitting the video conference is often prohibitive.

An MCU is a device commonly used to bridge video conferencing connections, and may more generally also be referred to as video conference bridge. The MCU may be connected to a Local Area Network (LAN), and provides the capability for three or more terminals and gateways to participate in a multipoint conference. An MCU has one port with a full range bandwidth and a codec (coder/decoder) for each participant providing video communication according to the H.264/MPEG-4 AVC standard and similar standards. MPEG is short for Moving Picture Experts Group and AVC is short for Advanced Video Coding. The H.264/MPEG-4 AVC standard is a standard for video compression.

In certain applications, video conference participants may be roughly divided into two groups: active participants and passive participants. Active participants may be categorized as those video conference participants who are actively speaking; on the other hand, passive participants may be categorized as those participants who are primarily viewing or watching the video conference. For example, a panel discussion may include several active participants who may or may not be located at different geographical locations. The panel discussion may also have an interested audience made up of multiple passive participants at various locations. In a traditional video conference setting, broadcasting this video conference to all participants would require the traditional broadcast of video conferencing to all locations. Accordingly, if the number of active and passive participants were in multiple different physical locations, this broadcast would require a significant amount of bandwidth and telecommunication resources. However, this is not an effective use of resources because the passive participants are not taking full advantage of the resources available.

In the case described above, too much redundant resources are used to keep the passive participants connected to the conference. One specific problem related to this is the fact that when one participant experiences packet loss, it will, according to the H.264/MPEG-4 AVC standard and other similar standards like SIP (Session Initiated Protocol) and H.323 (referred to as the Standard), require the MCU to create an I-frame (Intra frame) for all the participants connected to the MCU. This will appear as "blinking" effect to all the participants in the conference, i.e. the screen gets black for a moment followed by a picture starting with the new I-frame.

Therefore, there is a need for a broadband optimization and a way to prevent "blinking" when a passive participant in a video conference is exposed to packet loss.

SUMMARY

The embodiments herein disclose a method Orchestrator Unit for managing a multipoint video conference, wherein the multipoint video conference comprises a video conference bridge with a number of ports enabled to connect to media channels exchanging media data between participants in the multipoint video conference, a centralized server connected to or integrated in the video conference bridge and one or more distributed servers each associated with a respective home area/network, wherein the method comprises the steps of receiving and processing a call set up from a requesting participant, defining the requesting participant as an active or passive participant, if a Master unit does not exist, then instructing the centralized server to create and store information about a Master unit, and to establish at least one of a first media channel and/or a set of second media channels between the video conference bridge and the Master unit, if a Slave unit does not exist in a distributed server's associated home area/network in which the requesting participant is located, then instructing the distributed server to create and store information about a Slave unit, and instructing the Master unit to replicate the set of second media channels and route the replicated set of second media channels to the Slave unit, if the requesting participant is a passive participant, then instructing the Slave unit to replicate and route a selected one of the media channels of the replicated set of second media channels to the passive participant, if the requesting participant is an active participant, then instructing the Master unit to route the first media channel to the Slave unit and instructing the Slave unit to route the first media channel to the requesting participant.

In some embodiments, the step of defining the requesting participant as an active or passive participant further comprises defining a participant as an active participant if the participant is comprised in a predefined list of active participants, and defining the participant as a passive participant if the participant is not comprised in the predefined list of active participants.

In some embodiments, the step of defining the requesting participant as active or passive participants further comprises prompting a participant for entering a conference code and defining the participant as an active participant if the entered code is a predefined active participant conference code.

In some embodiments, each media channel in the set of second media channels is assigned to a predefined bandwidth.

In some embodiments, the selected one of the media channels of the replicated set of second media channels is the one having a bandwidth next to and below a bandwidth capability of the passive participant.

In some embodiments, the method further comprises the following step of executing an Internet Protocol, IP, address map look up of the requesting participant's IP address to determine to which of the distributed servers' associated home area/network the requesting participant is connected.

In some embodiments, the video conference bridge is an Multipoint Control Unit, MCU, and the requesting participant is a video conference endpoint or terminal.

In some embodiments, the one or more distributed server is a Point of Presence, POP, server(s).

The embodiments herein also disclose an Orchestrator Unit stored on a computer device for managing a multipoint video conference comprising a video conference bridge with a number of ports which may be connected to media channels exchanging media data between participants in the multipoint video conference, wherein the multipoint video conference further comprises a centralized server connected to or integrated in the video conference bridge, and one or more distributed servers each associated with a respective home area/network, which Orchestrator Unit further comprises receiving and processing means for receiving and processing a call set up from a requesting participant, defining means for defining the requesting participant as an active or passive participants, a first determining means for determining if a Master unit does not exist, a first control means for instructing the centralized server to create and store information about a Master unit, and to establish at least one of a first media channel and/or a set of second media channels between the video conference bridge and the Master unit when the first determining means determines that a Master unit does not exist, a second determining means for determining if a Slave unit does not exist in a distributed server's associated home area/network in which the requesting participant is located, a second control means for instructing the distributed server to create and store information about a Slave unit and the Master unit to replicate the set of second media channels when the second determining means determine that a Slave unit does not exist, a third determining means for determining if the requesting participant is a passive participant, a third control means for instructing the Slave unit to replicate and route a selected one of the media channels of the replicated set of second media channels to the passive participant when the third determining means determines that the requesting participant is a passive participant, a fourth determining means for determining if the requesting participant is an active participant, and a fourth control means for instructing the Master unit to route the first media channel to the Slave unit and for instructing the Slave unit to route the first media channel to the requesting participant when the fourth determining means determines that the requesting participant is an active participant.

In some embodiments, the defining means is adapted define a participant as an active participant if the participant is comprised in a predefined list of active participants, and to define the participant as a passive participant if the participant is not comprised in the predefined list of active participants.

In some embodiments, the defining means is adapted to define the requesting participant as an active or passive participants further comprises prompting a participant for entering a conference code and defining the participant as an active participant if the entered code is a predefined active participant conference code.

In some embodiments, the Orchestrator Unit further comprises and executing means for executing an Internet Protocol, IP, address map look up of the requesting participant's IP address to determine to which of the distributed servers' associated home area/network the requesting participant is connected.

BRIEF DESCRIPTION OF THE DRAWINGS

FIG. 1 is an illustration of an architecture according to an embodiment herein.

DETAILED DESCRIPTION

In the following, the embodiments herein will be discussed, and example embodiments described by referring to the accompanying drawings.

FIG. 1 shows a full range example of an architecture during an active multi-party video conference according to the embodiments herein. On top of the architecture, there is an MCU bridging the video conference. It has a multiple of ports connected to regular media channels according to the Standard. Media channels are the virtual communication channels in which media data like video, audio and/or presentation/collaboration data are exchange between two parties, e.g. in respective sub-media channels. It also has a dedicated number of ports with different qualities/bandwidths, but still according to the Standard. In the example of FIG. 1, there are three dedicated ports of three respective qualities/bandwidths.

The participants in a video conference according to the embodiments herein are classified as Presenter units and Listener units, depending on whether they are expected to be taking active roles in the video conference or being passive Listener units. Presenter units and Listener units are in the context of activity level referred to as human participants, but in the following, Presenter units and Listener units are mainly referred to as their associated endpoints or terminals which are adapted to communicate according to the Standard.

A Master unit is provided receiving the media channels from the MCU, both Presenter Media Channels, and Listener Media Channels of different qualities/bandwidths. The Presenter Media Channel is illustrated with a thick line in FIG. 1 and the Listener Media Channel is illustrated with a thin line in FIG. 1. The dotted line in FIG. 1 represents multiples. There is also an Application Control Signal connected between the MCU and the Master unit, illustrated with a black arrow in FIG. 1. The Master unit may be a server or computer unit or implemented on a general server or a computer unit or in an MCU.

There are also provided a number of Slave units to which the Presenter Media Channels and respective sets of Listener Media Channels are routed through an IP network, which could be the Internet or a dedicated media network. A Slave unit as referred to herein may be a unit on which a process/algorithm is implemented, or simply a sub-conference. A Slave unit may be a server or computer unit or implemented on a general server or a computer unit or in an MCU, and is hierarchically at a lower level than a Master unit.

Each set of Listener Media Channel may comprise the same number of channels as the number of dedicated ports with different qualities/bandwidths as being connected between the Master unit and the MCU, having the same respective qualities/bandwidths. In the example of FIG. 1, the set comprises three Listener Media Channels with three different qualities/bandwidths, illustrated with three thin lines in FIG. 1. Each Slave unit receives as many Presenter Media Channels as the number of Presenter units respectively connected, but only one set of Listener Media channels. Distribution Control Signal Channels are provided between the Master unit and the Slave unit, illustrated with a white arrow in FIG. 1. Each Slave unit is typically covering a respective home area, and could be established in a server covering a defined geographical area or a separate network such as a company network or a service provider network. This may be any kind of local area or separate network server used in a video network, but in this example, a POP (Point of Presence) server will be used.

The Master unit is adjusted to provide several functions. A video conference may be controlled by the Master unit according to the number of Presenter units and Listener units, the identity of which, and the bandwidth capabilities of the participants. The Master unit may also be supported by an Orchestrator Unit (not shown in the figure) at least being able to receive and respond to video call set up signaling according to the Standard, and at least directing the participants during call set up according to settings, access control and current status of the conference architecture.

For the purpose of disclosing the embodiments herein, a scenario of set up and execution of a video conference according to an example embodiment is discussed. There will also be referred to a number of alternatives during the discussion to illustrate the embodiments herein.

Prior to the video conference, the Orchestrator Unit has received a set of settings for the conference, which e.g. may be inserted by an administrator through a web page or a Management Suit. The settings comprise at least the bandwidth alternatives of the Listener Media Channel. This may typically be a default setting for a number of conferences. It may also comprise the identification of the Presenter units and the Listener units. The latter may alternatively be stated ad hoc, in that the Presenter units are provided with one access code and the Listener units with a different access code.

In one aspect of the embodiments herein, when a participant calls in to the conference, it is directed to the Orchestrator Unit. If it is the first participant, the Orchestrator Unit instructs to create a Master unit for the conference assigning the necessary processor and storage resources. The instructions may be directed to a server dedicated for the purpose, or to an MCU to be used in the conference. In any case, the Orchestrator Unit recognizes the participant as a Presenter unit or a Listener unit, either by a predefined list of Presenter units and Listener units or by recognition of a Presenter unit or Listener unit access code when the Participant is prompted to enter an access code for pop to the conference. A combined solution may be that the predefined list only comprises the Presenter units and that all participants entering the conference not being listed as Presenter units may be defined as Listener units.

Note that the participants may also be identified, granted access to the conference or be recognized as a Listener unit or a Presenter unit by means of other authentication schemes than by using access codes.

In any case, the Orchestrator Unit should state the new participant's home area by e.g. investigating the participant's IP address using an IP address locator as Geo IP Location or IP Address Map Look up, which is well known methods to locate an IP entity. If no Slave unit has been created in the local POP server covering this area, the Orchestrator Unit instructs the local POP server to create a Slave unit in the POP server associated with the conference assigning the necessary processor and storage resources.

In case of a Presenter unit calling in to the conference, the Orchestrator Unit instructs the Master unit to add a Presenter Media Channel between itself and the MCU. The Presenter Media Channel is further routed to the Participant through the Slave unit created in the POP server covering the Participant's home area.

In case of a Listener unit, and in case Listener Media Channels still are not created between the Master unit and the MCU, the Orchestrator Unit instructs the Master unit to add the Listener Media Channels between itself and the MCU according to the number of bandwidth alternatives stated in the above-mentioned settings. If the Listener Media Channels between the MCU and the Master unit already exist, no new media channels are established between them. Further, when a first Listener unit from a local area covered by a POP server enters the conference, a set of Listener Media Channels corresponding to the Listener Media Channels between the MCU and the Master unit are established between the Master unit and the Slave unit located in that POP server. Consequently, when a new Slave unit is added to the conference, a new set of Listener Media Channels is established from the Master unit to the respective new Slave unit. As indicated in FIG. 1, there will be as many sets of Listener Media Channels out from the Master unit as there are Slave units, but at the same time only one corresponding set of Listener Media Channels between the Master unit and the MCU. Instead of performing a regular routing of media channels from the MCU through the Master unit as being the case for the Presenter Media Channels, the Master unit is creating replicas of the Listener Media Channels between the MCU and the Master unit to create the sets of Listener unit Media Channels required to the Slave units. Specifically, the Master unit is copying the data packets from the different Listener Media Channels coming from the the MCU, and routing the copies to the respective Slave units.

When a Listener unit from a local area covered by a POP server in which a Slave unit already is created enters the conference, the Orchestrator Unit instructs the Slave unit to add a Listener Media Channel between the Slave unit and the Listener unit.

An equal replica process as described related to the Master unit will be executed in the different Slave units. Each Slave unit will receive only one set of Listener Media Channels from the Master unit, but there may be several Listener units connected to one Slave unit. The difference is that a Listener unit only needs one Listener Media Channel. Which of the media channels in the set of Media Channels it requires, depends on its bandwidth capability. In some embodiments, the Listener Media Channel with the bandwidth next to and below the Listener unit's bandwidth capability is selected. Bandwidth capability is communicated during call set up in a video conference according to the Standard.

As a result, this will allow for simplex media communication from the MCU to the Listener units or a full downlink transmission combined with a limited uplink transmission allowing for a small amounts of data like small pictures of the Listener units with low resolution intended for "picture in picture", and possibly audio for short comments and questions, as opposed to full duplex media communication provided to the Presenter units.

As being apparent from the description above, the way calls in to the conference are handled depends on the state of the architecture at the time the call arrives. Therefore, the Orchestrator Unit must at any time have access to an updated status of current architecture. Information about current architecture is therefore stored and updated at the Orchestrator Unit by way of data entries representing the different elements of the architecture and the connection between the entries. As an example, the Master unit and the MCU are stored as two respective entries, and when a new Presenter unit arrives, which in turn may initiate the creation of a new Slave unit, the Presenter unit and the Slave unit are added as new data entries in the architecture, in addition to the required new Media Channels.

According to one aspect of the embodiments herein, the selection of the Listener Media Channel from the set of Listener Media Channels received by a Slave unit that are assigned to a Listener unit associated with that Slave unit can be altered during a conference. Especially when increasing packet loss occurs between a Listener unit and its Slave unit, the true bandwidth capability of the Listener unit is reduced, and the bandwidth of the Media Channel received from the Slave unit should be changed to achieve a better human perception of the media communicated through the Media Channel. Measured packet loss above a certain level may therefore trigger a shift to the next step Media Channel bandwidth provided by the Slave unit below the current one. This may be executed by using the regular down speed scheme according to the Standard between the Listener unit and the Slave unit. Attempts of recreating the original bandwidth may be accomplished at later stage initiated after a period of absence of packet loss. An alternative to down speeding would be to transcode media from one of the media channels received from the Master unit to a bit rate more adjusted to the current bandwidth capability of a Listener unit. Transcoding means traditionally subsequent decoding and coding of coded media data to change size, coding standard, media format, bit rate or to mix media in the same data stream. The purpose of transcoding in this case would be to lower the video resolution of the coded video stream, so as to reduce the bit rate of the coded data accordingly. The Slave unit must then be equipped with decoder and encoder resources in order to be able to accomplish transcoding.

According to another aspect of the embodiments herein, the Presenter unit and Listener unit status of the conference participants should also be possible to alter during a conference. As an example, a participant currently being a Listener unit needs to upgrade to a Presenter unit status to allow for a duplex media communication all the way to the MCU to be able to send media to all the participants, e.g. for the purpose of replying to one of the other Presenter unit's comments. This would then be done by a sending a request to the Orchestrator Unit for an upgrade. As a response to that request, the Orchestrator Unit instructs the Master unit to add another Presenter Media Channel between itself and the MCU, and to route the Presenter Media Channel further on to the Slave unit with which the requesting participant is associated. The Orchestrator Unit further instructs the Slave unit to route the Presenter Media Channel down to the requesting participant, and to terminate the Listener Media Channel between the Slave unit and the requesting participant.

One of the advantages of the embodiments herein is the optimization of the bandwidth, MCU resources and routing in a video conference having an imbalance between the number of active participants and the number of passive participants. In addition, even if one of the passive participant's bandwidth decreases during a conference, the other participants would not suffer from that by having to down speed the media transmission, which would require transmission of a new I-frame resulting in a "blinking" effect and a following degradation of the video quality for all the participants, which would be the case for a regular video conference involving an MCU.

The invention claimed is:

1. A method for managing a multipoint video conference, wherein the multipoint video conference comprises a video conference bridge with a number of ports enabled to connect to media channels exchanging media data between participants in the multipoint video conference, a centralized server connected to or integrated in the video conference bridge, and one or more distributed servers each associated with a respective home area/network, the method comprising:
   receiving and processing a call set up from a requesting participant;
   defining the requesting participant as an active or a passive participant;
   if a Master unit does not exist,
      instructing the centralized server to create and store information about a Master unit, and establishing at least one of a first media channel or a set of second media channels between the video conference bridge and the Master unit;
   if a Slave unit does not exist in the one or more distributed server's associated home area/network in which the requesting participant is located,
      instructing the distributed server to create and store information about the Slave unit, and instructing the Master unit to replicate the set of second media channels and route the replicated set of second media channels to the Slave unit;
   if the requesting participant is a passive participant,
      instructing the Slave unit to replicate and route a selected one media channel of the replicated set of second media channels to the passive participant according to a bandwidth capability of the passive participant; and
   if the requesting participant is an active participant,
      instructing the Master unit to route the first media channel to the Slave unit and instructing the Slave unit to route the first media channel to the requesting participant.

2. The method according to claim 1, wherein defining the requesting participant as an active or passive participant further comprises defining a participant as an active participant if the participant is included in a predefined list of active participants, and defining the participant as a passive participant if the participant is not included in the predefined list of active participants.

3. The method according to claim 1, wherein defining the requesting participant as an active or passive participants further comprises prompting a participant for entering a conference code and defining the participant as an active participant if the entered code is a predefined active participant conference code.

4. The method according to claim 1, wherein each media channel in the set of second media channels is assigned to a predefined bandwidth.

5. The method according to claim 1, wherein the selected one of the media channels of the replicated set of second media channels is the one having a bandwidth next to and below a bandwidth capability of the passive participant.

6. The method according to claim 1, further comprising:
   executing an Internet Protocol(IP) address map look up of the requesting participant's IP address to determine to which of the distributed servers' associated home area/network the requesting participant is connected.

7. The method according to claim 1, wherein the video conference bridge is an Multipoint Control Unit (MCU) and the requesting participant is one of a video conference endpoint or terminal.

8. The method according to claim 1, wherein the one or more distributed servers is a Point of Presence (POP) server.

9. An Orchestrator Unit stored on a computer device for managing a multipoint video conference comprising a video conference bridge with a number of ports which are connected to media channels exchanging media data between participants in the multipoint video conference, wherein the multipoint video conference further comprises a centralized server connected to or integrated in the video conference bridge and one or more distributed servers each associated with a respective home area/network, the Orchestrator Unit comprising:
   receiving and processing means for receiving and processing a call set up from a requesting participant;
   defining means for defining the requesting participant as an active or passive participant;
   a first determining means for determining if a Master unit does not exist;
   a first control means for instructing the centralized server to create and store information about a Master unit, and establishing at least one of a first media channel or a set of second media channels between the video conference bridge and the Master unit when the first determining means determines that a Master unit does not exist;

a second determining means for determining if a Slave unit does not exist in the one or more distributed server's associated home area/network to which the requesting participant is connected;

a second control means for instructing the distributed server to create and store information about the Slave unit and the Master unit to replicate the set of second media channels when the second determining means determines that a Slave unit does not exist;

a third determining means for determining if the requesting participant is a passive participant;

a third control means for instructing the Slave unit to replicate and route a selected one media channel of the replicated set of second media channels to the passive participant according to a bandwidth capability of the passive participant when the third determining means determines that the requesting participant is a passive participant;

a fourth determining means for determining if the requesting participant is an active participant; and a fourth control means for instructing the Master unit to route the first media channel to the Slave unit and for instructing the Slave unit to route the first media channel to the requesting participant when the fourth determining means determines that the requesting participant is an active participant.

* * * * *